United States Patent [19]

Kioka et al.

[11] Patent Number: 5,153,158

[45] Date of Patent: Oct. 6, 1992

[54] SOLID CATALYST COMPONENTS FOR OLEFIN POLYMERIZATION AND PROCESSES FOR THE POLYMERIZATION OF OLEFIN USING SAME

[75] Inventors: Mamoru Kioka; Masao Nakano; Takashi Ueda, all of Kuga, Japan

[73] Assignee: Mitsui Petrochemical Industries, Ltd., Tokyo, Japan

[21] Appl. No.: 634,737

[22] Filed: Dec. 27, 1990

[30] Foreign Application Priority Data

Dec. 29, 1989 [JP] Japan .................................. 1-340909

[51] Int. Cl.$^5$ .............................................. C08F 4/656
[52] U.S. Cl. .................................... 502/126; 502/108; 502/125; 502/112
[58] Field of Search ............... 502/108, 118, 124, 125, 502/126, 127, 112

[56] References Cited

U.S. PATENT DOCUMENTS

| | | | |
|---|---|---|---|
| 4,304,891 | 12/1981 | Sato et al. ........................ | 502/108 X |
| 4,325,837 | 4/1982 | Capshew et al. .................... | 502/108 |
| 4,326,988 | 4/1982 | Welch et al. ...................... | 502/108 X |
| 4,721,763 | 1/1988 | Bailly et al. ...................... | 502/108 X |

FOREIGN PATENT DOCUMENTS

| | | |
|---|---|---|
| 0120734 | 10/1984 | European Pat. Off. . |
| 0338676 | 10/1989 | European Pat. Off. . |
| 0415588 | 3/1991 | European Pat. Off. . |
| 3245245 | 6/1983 | Fed. Rep. of Germany . |
| 2066274 | 7/1981 | United Kingdom ................ 502/108 |

*Primary Examiner*—Patrick P. Garvin
*Attorney, Agent, or Firm*—Sherman and Shalloway

[57] ABSTRACT

The present invention relates to solid catalyst components for olefin polymerization formed by prepolymerizing at least two types of α-olefin on an olefin polymerization catalyst comprising a solid titanium catalyst component, an organometallic compound catalyst component, and if necessary, an electron donor, to olefin polymerization catalyst comprising said solid catalyst component for olefin polymerization, an organometallic compound catalyst component, and if necessary, an electron donor, and to processes for olefin polymerization using said olefin polymerization catalyst.

According to the present invention, there can be manufactured olefin polymer particles having low adhesive among the polymer particles as well as good particle distribution and excellent granular properties even when they contain a large amount of an amorphous olefin polymer portion.

8 Claims, No Drawings

SOLID CATALYST COMPONENTS FOR OLEFIN POLYMERIZATION AND PROCESSES FOR THE POLYMERIZATION OF OLEFIN USING SAME

FIELD OF THE INVENTION

The present invention relates to solid catalyst components for olefin polymerization and processes for the polymerization of olefin using the catalyst components. More in detail, the present invention relates to olefin polymerization solid catalyst components which is capable for producing, in the manufacture of a copolymer containing an amorphous portion, olefin polymer particles showing no adhesion among the formed polymer particles and having excellent particle flowability even when they contain a large amount of an amorphous olefin polymer portion, and processes for the polymerization of olefin using said olefin polymerization catalyst components.

BACKGROUND OF THE INVENTION

There have heretofore been many proposals concerning the preparation of solid titanium catalyst components containing magnesium, titanium and halogen as essential ingredients. It has been known that olefin polymerization catalysts containing such a solid titanium catalyst component and an organometallic compound component of a metal belonging to Group I to III in the periodic table exhibit excellent activity in olefin polymerization. However, further improvement has been desired in the polymerization activity of such olefin polymerization catalysts and powder properties of olefin polymers, especially olefin copolymers obtained by using such catalysts.

For example, when there was tried the preparation of olefin polymer particles consisting of a crystalline olefin polymer portion and an amorphous olefin polymer portion using such an olefin polymerization catalyst as described above, the polymer particles sometimes showed an increase in adhesion among the particles and a decrease in their particle flowability with an increase in the amount of amorphous olefin polymer portion (rubber portion) in the polymer particles. The polymer particles sometimes still more adhered together and markedly lowered their particle flowability when the polymer particles were subjected to steam treatment to deactivate the catalyst component therein, when the polymer particles were heated to remove volatile component therein, or when dried by heating.

Accordingly, it has been desired to make appearance of the olefin polymerization catalysts which is capable of producing olefin polymer particles tending not to show deterioration of their particle flowability caused by adhesion among the particles even when they contain a large amount of an amorphous olefin polymer portion.

The present inventors have carried out intensive research on the preparation of olefin polymer particles showing low adhesion among them and having good particle distribution and excellent particle properties even when they contain a large amount of an amorphous olefin polymer portion. As a result of prosecuting the research, it has been found that polymer particles as described above can be obtained by employing solid catalyst components for olefin polymerization formed by prepolymerization of olefin on an olefin polymerization catalyst comprising a solid catalyst component, an organometallic compound and, if necessary, an electron donor, in suspension in a liquid α-olefin or α-olefins, wherein at least two types of α-olefin including said liquid α-olefin is prepolymerized, in a specific amount, and a first olefin polymerization catalyst component according to the present invention and a process for olefin polymerization using said catalyst have thus been completed.

Furthermore, it has been found that the above-described object can be achieved by being employing a solid catalyst component for olefin polymerization formed by prepolymerizing a specific amount of at least two types of α-olefin on an olefin polymerization catalyst comprising a solid catalyst component, an organometallic compound and, if necessary, an electron donor, in suspension in a hydrocarbon solvent, and a second olefin polymerization catalyst component according to the invention and a process for olefin polymerization using said catalyst component have thus been completed.

OBJECT OF THE INVENTION

The present invention has been accomplished in light of the prior art as mentioned above, and an object of the invention is to provide solid catalyst components for olefin polymerization which is capable for producing olefin polymer particles showing low adhesion among the particles and having good particle distribution and excellent particle properties even when they contain a large amount of an amorphous olefin polymer portion, olefin polymerization catalysts comprising said catalyst component, and processes for the polymerization of olefin using said catalysts.

SUMMARY OF THE INVENTION

The first solid catalyst component for olefin polymerization of the present invention is characterized by being formed by random prepolymerization of olefin on an olefin polymerization catalyst comprising

[A] a solid titanium catalyst component comprising magnesium, titanium and halogen as its essential ingredients, and, if necessary, an electron donor,

[B] an organometallic compound catalyst component of a metal belonging to Group I to III in the periodic table, and, if necessary,

[C] an electron donor, and being in suspension in a liquid α-olefin, wherein at least two types of α-olefin including said liquid α-olefin is prepolymerized on said olefin polymerization catalyst, in an amount of from 0.2 to 4,000 g, based on 1 g of said solid titanium catalyst component [A].

The first olefin polymerization catalyst of the present invention is characterized by comprising

[Ia] a solid catalyst component for olefin polymerization formed by prepolymerization of olefin on an olefin polymerization catalyst comprising a solid titanium catalyst component [A] comprising magnesium, titanium and halogen as its essential ingredients, and, if necessary, an electron donor, an organometallic compound catalyst component [B] of a metal belonging to Group I to III in the periodic table, and, if necessary, an electron donor [C], and being in suspension in a liquid α-olefin, wherein at least two types of α-olefin including said liquid α-olefin is prepolymerized on said olefin polymerization catalyst, in an amount of from 0.2 to 4,000 g, based on 1 g of said solid titanium catalyst component [A],

[II] an organometallic compound catalyst component of a metal belonging to Group I to III in the periodic table, and, if necessary,

[III] an electron donor.

The second solid catalyst component for olefin polymerization of the present invention is characterized by formed by random prepolymerization of olefin on an olefin polymerization catalyst comprising

[A] a solid titanium catalyst component comprising magnesium, titanium and halogen as its essential ingredients, and, if necessary, an electron donor,

[B] an organometallic compound catalyst component of a metal belonging to Group I to III in the periodic table, and, if necessary,

[C] an electron donor, and being in suspension in a hydrocarbon solvent [D], wherein at least two types of α-olefin is prepolymerized on said olefin polymerization catalyst, in an amount of from 0.2 to 2,000 g, based on 1 g of said solid titanium catalyst component [A].

The second olefin polymerization catalyst of the present invention is characterized by comprising ]Ib] a solid catalyst component for olefin polymerization formed by prepolymerization of olefin on an olefin polymerization catalyst comprising a solid titanium catalyst component [A] comprising magnesium, titanium and halogen as its essential ingredients, and, if necessary, an electron donor, an organometallic compound catalyst component [B] of a metal belonging to Group I or III in the periodic table, and, if necessary, an electron donor [C], and being in suspension in liquid hydrocarbon solvent [D], wherein at least two types of α-olefin is prepolymerized on said olefin polymerization catalyst, in an amount of from 0.2 to 2,000 g, based on 1 g of said solid titanium catalyst component [A],

[II] an organometallic compound catalyst component of a metal belonging to Group I to III in the periodic table, and, if necessary,

[III] an electron donor.

The process for the polymerization of olefins of the present invention is characterized by polymerizing or copolymerizing the olefins in the presence of the olefin polymerization catalysts as illustrated above.

DETAILED DESCRIPTION OF THE INVENTION

The solid catalyst components for olefin polymerization of the present invention, olefin polymerization catalysts comprising said catalyst components and the process for the polymerization of olefins using said olefin polymerization catalysts are illustrated below in detail.

In the present invention, the term "polymerization" is sometimes used in a sense that it includes not only homopolymerization but also copolymerization, and also the term "polymer" is sometimes used in a sense that it includes not only homopolymer but also copolymer.

The first solid catalyst component [Ia] for olefin polymerization according to the present invention is formed by random prepolymerization of olefin on an olefin polymerization catalyst comprising

[A] a solid titanium catalyst component comprising magnesium, titanium and halogen as its essential ingredients, and, if necessary, an electron donor,

[B] an organometallic compound catalyst component of a metal belonging to Group I to III in the periodic table, and, if necessary,

[C] an electron donor, and being in suspension in a liquid α-olefin, wherein at least two types of α-olefin including said liquid α-olefin is prepolymerized on said olefin polymerization catalyst, in an amount of from 0.2 to 4,000 g, based on b 1 g of said solid titanium catalyst component [A].

First, the titanium catalyst component as mentioned in [A] above is illustrated.

The above-mentioned solid titanium catalyst component [A] may be prepared by bringing a magnesium compound, a titanium compound and, if necessary, an electron donor into contact with one another.

Titanium compound useful for the preparation of the solid titanium catalyst component [A] includes tetravalent titanium compounds usually represented by the formula $Ti(OR)_gX_{4-g}$ (wherein R is a hydrocarbon group, X is halogen, and $0 \leq g \leq 4$). More particularly, these titanium compounds include titanium tetrahalides such as $TiCl_4$, $TiBr_4$, and $TiI_4$; alkoxytitanium trihalides such as $Ti(OCH_3)Cl_3$, $Ti(OC_2H_5)Cl_3$, $Ti(O\text{ n-}C_4H_9)Cl_3$, $Ti(O\text{ iso-}C_4H_9)Cl_3$, $Ti(OC_2H_5)Br_3$, and $Ti(O\text{ iso-}C_4H_9)Br_3$; alkoxytitanium dihalides such as $Ti(OCH_3)_2Cl_2$, $Ti(OC_2H_5)_2Cl_2$, $Ti(O\text{ n-}C_4H_9)_2Cl_2$, and $Ti(OC_2H_5)_2Br_2$; trialkoxytitanium monohalides such as $Ti(OCH_3)_3Cl$, $Ti(OC_2H_5)_3Cl$, $Ti(O\text{ n-}C_4H_9)_3Cl$ and $Ti(OC_2H_5)_3Br$; and tetraalkoxytitanium such as $Ti(OCH_3)_4$, $Ti(OC_2H_5)_4$, $Ti(O\text{ n-}C_4H_9)_4$, $Ti(O\text{ iso-}C_4H_9)_4$ and $Ti(O\text{ 2-ethylhexyl})_4$. Further, trivalent titanium compound such as $TiCl_3$ may be used.

Of the useful titanium compounds as exemplified above, preferred are halogen containing titanium compounds, in particular, titanium tetrahalides and especially titanium tetrachloride. These titanium compounds may be used either singly or in admixture of two or more, and also they may be diluted, before use, with hydrocarbon compounds or halogenated hydrocarbon compounds.

Magnesium compounds useful for the preparation of the solid titanium catalyst component [A] in the present invention include those having reducing ability and those having no reducing ability.

The magnesium compounds having reducing ability as referred to herein include, for example, those having a magnesium-carbon bond or magnesium-hydrogen bond. Concrete examples of such magnesium compounds as having reducing ability include dimethylmagnesium, diethylmagnesium, dipropylmagnesium, dibutylmagnesium, diamylmagnesium, dihexylmagnesium, didecylmagnesium, ethylmagnesium chloride, propylmagnesium chloride, butylmagnesium chloride, hexylmagnesium chloride, amylmagnesium chloride, butyl ethoxy magnesium, ethyl butyl magnesium, octyl butyl magnesium, butylmagnesium halide, etc. The magnesium compounds exemplified above may be used singly, or may form complex compounds with organoaluminum compounds as will be mentioned later, and they also may be either liquid or solid.

Concrete examples of magnesium compounds having no reducing ability include halogenated magnesium such as magnesium chloride, magnesium bromide, magnesium iodide or magnesium fluoride; alkoxy magnesium halide such as methoxy magnesium chloride, ethoxy magnesium chloride, isopropoxy magnesium chloride, butoxy magnesium chloride or octoxy magnesium chloride; aryloxy magnesium halide such as phenoxy magnesium chloride or methylphenoxy magnesium halide; alkoxy magnesium such as ethoxy magnesium, isopropoxy magnesium, butoxy magnesium, n-octoxy magnesium or 2-ethylhexoxy magnesium; aryloxy magnesium such as phenoxy magnesium or dimethylphenoxy magnesium; and magnesium carboxylate such as magnesium laurate or magnesium stearate.

The magnesium compounds having no reducing ability exemplified above may be compounds derived from the above-mentioned magnesium compounds having reducing ability or compound derived at the time of preparation of catalyst component. The magnesium compound having no reducing ability may be derived from the magnesium compounds having reducing ability, for example, by bringing said magnesium compounds having reducing ability into contact with polysiloxane compounds, halogen containing silane compounds, halogen containing aluminum compounds or compounds such as esters, alcohols, etc.

The magnesium compounds used in the present invention may also be complex or composite compounds of the above-mentioned magnesium compounds with other metals, or mixtures thereof. Further, the magnesium compounds used herein may also be mixtures of two or more of these compounds mentioned above.

Of these magnesium compounds exemplified above, preferred are those having no reducing ability, particularly halogen containing magnesium compounds. Of the halogen containing magnesium compounds, preferred are magnesium chloride, alkoxy magnesium halide and aryloxy magnesium halide.

In the present invention, an electron donor is preferably used for the preparation of the solid titanium catalyst component [A]. The electron donors include esters of organic carboxylic acids, preferably esters of polybasic carboxylic acids or esters of organic carboxylic acids with polyhydric alcohols. More concretely, the electron donors include compounds represented by the formulas

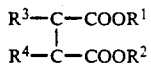

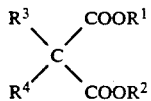

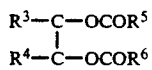

wherein $R^1$ is a substituted or non-substituted hydrocarbon group, $R^2$, $R^5$ and $R^6$ are each a hydrogen atom, or a substituted or non-substituted hydrocarbon group, and $R^3$ and $R^4$ are each a hydrogen atom or a substituted or non-substituted hydrocarbon group. In addition, it is preferable that at least one of $R^3$ or $R^4$ is a substituted or non-substituted hydrocarbon group. Moreover, $R^3$ and $R^4$ may also be bonded together to form a ring structure. The substituted hydrocarbon groups described above include those containing each a hetero atom or hetero atoms such as N, O and S, for example, substituted hydrocarbon groups having a structure of —C—O—C—, —COOR, —COOH, —OH, —SO₃H, —C—N—C— or —NH₂.

Of these esters, there are preferably used diesters derived from a dicarboxylic acid having an alkyl group containing at least two carbon atoms as at least either one of $R^1$ and $R^2$.

Concrete examples of the polybasic carboxylic acids include:

esters of aliphatic polycarboxylic acids such as diethyl succinate, dibutyl succinate, diethyl methylsuccinate, diisobutyl α-methylglutarate, dibutylmethyl malonate, diethyl malonate, diethyl ethylmalonate, diethyl isopropylmalonate, diethyl butylmalonate, diethyl phenylmalonate, diethyl diethylmalonate, diethyl allylmalonate, diethyl diisobutylmalonate, diethyl di-n-butylmalonate, dimethyl maleate, monooctyl maleate, diisooctyl maleate, diisobutyl maleate, diisobutyl butylmaleate, diethyl butylmaleate, diisopropyl β-methylglutarate, diarlyl ethylsuccinate, di-2-ethylhexyl fumarate, diethyl itaconate, diisobutyl itaconate, diisooctyl citraconate and dimethyl citraconate;

esters of aliphatic polycarboxylic acids such as diethyl 1,2-cyclohexanedicarboxylic acid, diisobutyl 1,2-cyclohexanedicarboxylic acid, diethyl tetrahydrophthalate and nadic acid diethyl;

esters of aromatic polycarboxylic acids such as monoethyl phthalate, dimethyl phthalate, methyl ethyl phthalate, monoisobutyl phthalate, diethyl phthalate, ethyl isobutyl phthalate, mono-n-butyl phthaltate, ethyl n-butyl phthalate, di-n-propyl phthalate, diisopropyl phthalate, di-n-butyl phthalate, diisobutyl phthalate, di-n-pentyl phthalate, diisopentyl phthalate, di-n-hexyl phthalate, diisohexyl phthalate, di-n-heptyl phthalate, diisoheptyl phthalate, di-n-octyl phthalate, diisooctyl phthalate, di-n-heptyl phthalate, di-2-ethylhexyl phthalate, didecyl phthalate, benzyl butyl phthalate, diphenyl phthalate, diethyl naphthalenedicarboxylate, dibutylnaphthalenedicarboxylate, triethyl trimellitate and dibutyl trimellitate; and esters derived from heterocyclic polycarboxylic acids such as 3,4-furandicarboxylic acid.

Other examples of polybasic carboxylic acids include esters derived from long chain dicarboxylic acids such as diethyl adipate, diisobutyl adipate, diisopropyl sebacate, di-n-butyl sebacate, n-octyl sebacate and di-2-ethylhexyl sebacate.

Of these polybasic carboxylic acid esters, compounds having a skeletal structure represented by the above-described general formulas are preferable. Esters derived from an alcohol having not less than 2 carbon atoms and a carboxylic acid such as phthalic acid, maleic acid and substituted malonic acid are more preferable, and esters derived from an alcohol having not less than 2 carbon atoms and phthalic acid are particularly preferable.

The practice of the present invention does not always require such a polybasic carboxylic acid ester as described above to be used as a starting material. There may also be used a compound which is capable for deriving the polybasic carboxylic acid in the course of preparing the solid titanium catalyst component [A], and, as a result, the polybasic carboxylic acid ester is formed at the stage of preparing the solid titanium catalyst component [A]. For example, phthalic acid anhydride, phthalic acid or phthaloyl chloride may be subjected to a chemical treatment such as esterification reaction in the process for synthesizing the catalyst.

Electron donors other than polybasic acids, which can be used in preparing the solid titanium catalyst component [A] include the following compounds used in prepolymerization or polymerization as will be described later: alcohols, amines, amides, ethers, ketones, nitriles, phosphines, stibines, arsines, phosphoramides, esters, thioethers, thioesters, acid anhydrides. acid halides, aldehydes, alcoholates, organosilicon compounds such as alkosy(arloxy)silanes, organic acids and, amides and salts of metal belonging to Group I and IV in the periodic table. In addition, diethers may also be mentioned as preferable examples.

The solid titanium catalyst component ]A] may be prepared by bringing the above-mentioned magnesium compound (or metallic magnesium), titanium compound and, if necessary, electron donor into contact with one another. In preparing the solid titanium catalyst components [A], there may be employed the known method for the preparation of highly active titanium catalyst components from magnesium compounds, titanium compounds and, if necessary, electron donors. The above-mentioned components may also be brought into contact with one another in the presence of other reaction reagents, for example, silicon, phosphorus and aluminum.

Briefly illustrated below are several examples of the process for the preparation of these solid titanium catalyst components [A].

In the following processes for the preparation of the solid titanium catalyst component [A] as will be illustrated below, electron donors are used, but the use of the electron donors is not always necessary.

(1) A process wherein a magnesium compound or a complex compound comprising the magnesium compound and electron donor is allowed to react with the titanium compound in the liquid phase. The reaction may also be carried out in the presence of a pulverizing assistant. In carrying out the reaction as described above, solid compounds may be ground. Moreover, in carrying out this reaction, each reactant may be pretreated with a reaction assistant such as the electron donor and/or an organoaluminum compound or a halogen containing silicon compound. In this process, the above mentioned electron donor is used at least one time.

(2) A process wherein a liquid magnesium compound having no reducing ability is allowed to react with a liquid titanium compound in the presence of an electron donor, thereby depositing a solid magnesium titanium composite.

(3) A process wherein the reaction product obtained in the process (2) is allowed to react further with a titanium compound.

(4) A process wherein the reaction product obtained in the process (1) or (2) is allowed to react further with an electron donor and a titanium compound.

(5) A process wherein a solid product obtained by pulverizing a magnesium compound or a complex compound comprising a magnesium compound and an electron donor in the presence of a titanium compound is treated with any of halogen, a halogen compound and an aromatic hydrocarbon. In carrying out this process, the magnesium compound or the complex compound comprising the magnesium compound and the electron donor may be pulverized in the presence of a pulverizing assistant. Further, after pulverizing the magnesium compound or the complex compound comprising the magnesium compound and the electron donor in the presence of the titanium compound, the solid product obtained thereby is pretreated with a reaction assistant, followed by treatment with halogen or the like. The reaction assistant used herein includes an organoaluminum compound or a halogen containing silicon compound. In this process, the electron donor is used at least one time.

(6) A process wherein the compound obtained in the processes (1)–(4) is treated with halogen, a halogen compound or an aromatic hydrocarbon.

(7) A process wherein a contact reaction product of a metal oxide with dihydrocarbyl magnesium and a halogen containing alcohol is brought into contact with an electron donor and a titanium compound.

(8) A process wherein a magnesium compound such as magnesium salt of an organic acid, alkoxymagnesium or aryloxymagnesium is allowed to react with an electron donor, a titanium compound and/or a halogen containing hydrocarbon.

(9) A process wherein a catalyst component contained in a hydrocarbon solution at least comprising a magnesium compound, alkoxytitanium and/or an electron donor such as alcohol or ether is allowed to react with a titanium compound and/or a halogen containing compound such as a halogen containing silicon compound. In either one of the steps in the process, an electron donor typical example of which is diester of phthalic acid is allowed to coexist.

(10) A process wherein a solid magnesium compound/electron donor complex having an average particle diameter of 1 to 200 $\mu$m and geometrical standard deviation ($\delta g$) of the particle distribution of not greater than 3.0 without pretreatment or with pretreatment with reaction assistants such as an electron donor and/or an organoaluminum compound, or a halogen containing silicon compound is allowed to react with a halogenated titanium compound, preferably titanium tetrachloride.

(11) A process wherein a liquid magnesium compound having no reducing ability is allowed to react with a liquid titanium compound preferably in the presence of an electron donor to deposit a solid component having an average particle diameter of 1 to 200 $\mu$m and geometrical standard deviation ($\delta g$) of the particle size distribution of not greater than 3.0. The resultant solid component is, if necessary, allowed to react with a liquid titanium compound, preferably titanium tetrachloride, or a liquid titanium compound and an electron donor.

(12) A process wherein a liquid magnesium compound having reducing ability is brought into precontact with such a reaction assistants having ability to lose reducing ability of the magnesium compound such as a polysiloxane or a halogen containing silicon compound, thereby depositing a solid component having an average particle diameter of 1 to 200 $\mu$m and geometrical standard deviation ($\delta g$) of the particle size distribution of not greater than 3.0, and the solid component is allowed to react with a liquid titanium compound, preferably titanium tetrachloride, or a titanium compound and an electron donor.

(13) A process wherein a magnesium compound having reducing ability is brought into contact with an inorganic carrier such as silica or an organic carrier, the carrier is then brought into contact with a halogen containing compound if necessary, and the carrier is brought into contact with a liquid titanium compound, preferably titanium tetrachloride or a titanium compound and an electron donor to react the magnesium compound supported on the carrier with the titanium compound.

(14) The process described in (11) or (12) wherein the reaction is conducted in the presence of an inorganic carrier such as silica and alumina, or an organic carrier such as polyethylene, polypropylene and polystyrene, thereby carrying the resultant Mg compound on the carrier.

Of the processes for preparing the solid titanium catalyst component [A] mentioned above in (1) to (14), preferred are those processes in which a liquid titanium halide is used during the catalyst preparation or those processes in which a halogenized hydrocarbon is employed after or during the use of a titanium compound, and particularly preferred are the processes mentioned above in (10) to (14).

The amount of each of the above-mentioned components used in the preparation of the solid titanium catalyst component [A] cannot be indiscriminately defined, because it varies according to the process employed. For example, however, there may be used, based on 1 mole of the magnesium compound, the electron donor in an amount of about 0.01–5 moles, preferably 0.05–2 moles, and the titanium compound in an amount of about 0.01–500 moles, preferably 0.05–300 moles.

The solid titanium catalyst component thus obtained contains magnesium, titanium and halogen as its essential ingredients and, if necessary, an electron donor.

In the solid titanium catalyst component [A], halogen/Ti (atomic ratio) is about 4–200, preferably about 5–100, the above-mentioned electron donor/Ti (molar ratio) is about 0.1–10, preferably about 0.2–6, and Mg/Ti (atomic ratio) is about 1–100, preferably about 2–50.

In comparison with commercially available halogenated magnesium, the solid titanium catalyst component [A] contains halogenated magnesium having small crystal size whose specific surface area is usually larger than about 50 m$^2$/g, preferably about 60–1000 m$^2$/g and especially about 100–800 m$^2$/g. This solid titanium catalyst component [A] does not substantially change in composition when it is washed with hexane, because the above-mentioned components used in said solid titanium catalyst component [A] are integrated into an integrated catalyst component.

The solid titanium catalyst component [A] as described above has an average particle diameter of 5 to 300 μm, preferably 10 to 150 μm, more preferably 15 to 100 μm, and geometrical standard deviation of the particle distribution of 1.0 to 3.0, preferably 1.0 to 2.0, more preferably 1.0 to 1.5, particularly preferably 1.0 to 1.3.

The average particle diameter of the solid titanium catalyst component [A] is measured by a procedure described below. Concretely, a portion of a dispersion prepared by dispersing the catalyst component [A] in decane as a medium in such a manner as to give a dispersion containing 1 to 5 wt./vol. % of the catalyst component [A] is placed on a slide for optical microscope photography in a nitrogen atomosphere so that the dispersion is not brought into contact with air. The upper side of the slide is covered with a cover glass, and group of the catalyst particles is pholographed magnifing 100 to 400 times by the optical microscope. The major and minor axes of arbitrarily selected 100 catalyst particles in the photographed image are measured, and the catalyst particle diameter is determined as ½ value of the sum of the major and minor axes measured above.

Data with regard to the above-mentioned 100 catalyst particles are plotted on a logarithmic probability graph by taking the catalyst particle diameter as abscissa and a number of those catalyst particles having a diameter not greater than said catalyst particle diameter as ordinate. The plots are linked to obtain a curve. The catalyst particle diameter on the abscissa correspondiung to a number of 50 as ordinate is taken as the average particle diameter ($D_{50}$). Similarly, the catalyst particle diameter on the abscissa corresponding to a number of 16 as ordinate is taken as a particle diameter ($D_{16}$). The ratio of $D_{50}/D_{16}$ is calculated from $D_{50}$ and $D_{16}$, and is defined as geometrical standard deviation ($\delta g$).

Further, the solid catalyst component [A] is preferably in the form of true sphere, oval or granule. Its particles have an aspect ratio of preferably not higher than 3, more preferably not higher than 2, particularly preferably not higher than 1.5.

The aspect ratio is obtained by observing group of the catalyst particles with an optical microscope, and measuring the major and minor axes of arbitrarily selected 50 of the catalyst particles.

The processes for the preparation of such highly active titanium catalyst components [A] as mentioned above are disclosed, for example, in Japanese Patent L-O-P Nos. 108385/1975, 126590/1975, 20297/1976, 28189/1976, 64586/1976, 2885/1976, 136625/1976, 87489/1977, 100596/1977, 147688/1977, 104593/1977, 2580/1978, 40093/1978, 40094/1978, 43094/1978, 135102/1980, 135103/1980, 152710/1980, 811/1981, 11908/1981, 18606/1981, 83006/1983, 138705/1983, 138706/1983, 138707/1983, 138708/1983, 138709/1983, 138710/1983, 138715/1983, 23404/1985, 195108/1985, 21109/1986, 37802/1986 and 37803/1986.

The organometallic compound catalyst component [B] is illustrated hereinafter.

Examples of the organoaluminum compound catalyst component [B] of a metal belonging to Group I to III in the periodic table include organoaluminum compounds represented by the following formula (i)

$$R^1{}_m Al(OR^2)_n H_p X_q \qquad (i)$$

wherein $R^1$ and $R^2$ may be the same or different and represent independently a hydrocarbon group having normally 1 to 15 carbon atoms, preferably 1 to 4 carbon atoms; X is halogen; and m, n, p and q are numbers satisfying $0<m\leqq 3$, $0\leqq n<3$, $0\leqq p<3$, $0\leqq q<3$ and $m+n+p+q=3$;

complex alkyl compounds of aluminum with Group I metals of the periodic table, represented by the following formula (ii)

$$M^1 AlR^1{}_4 \qquad (ii)$$

wherein $M^1$ is Li, Na or K and $R^1$ is as defined above; and dialkyl compounds of Group II or III metals represented by the following formula $$R^1 R^2 M^2 \qquad (iii)$$

wherein $R^1$ and $R^2$ are as defined above, and $M^2$ is Mg, Zn or Cd.

Examples of the organoaluminum compounds having the formula (i) include:

compounds having the general formula of $R^1{}_mAl(OR^2)_{3-m}$ wherein $R^1$ and $R^2$ are as defined above, and m is a number preferably satisfying $1.5 \leq m \leq 3$;

compounds having the general formula of $R^1{}_mAlX_{3-m}$ wherein $R^1$ and X are as defined above, and m is a number preferably satisfying $0 < m < 3$;

compounds having the general formula of $R^1{}_mAlH_{3-m}$ wherein $R^1$ is as defined above, and m is a number preferably satisfying $2 \leq m < 3$; and compounds having the general formula of $R^1{}_mAl(OR^2)_n X_q$ wherein $R^1$, $R^2$ and X are as defined above, and m, n and q are numbers satisfying $0 < m \leq 3$, $0 \leq n < 3$, $0 \leq q < 3$ and $m+n+q=3$.

Concrete examples of the organoaluminum compounds having the formula (i) include trialkylaluminum compounds such as triethylaluminum and tributylaluminum;

trialkenylaluminum compounds such as triisoprenylaluminum;

dialkylaluminum alkoxides such as diethylaluminum ethoxide and dibutylaluminum butoxide;

alkylaluminum sesquialkoxides such as ethylaluminum sesquiethoxide and butylaluminum sesquibutoxide;

partially alkoxylated alkylaluminum compounds such as those having an average composition represented by, for example, the formula of $R^1{}_{2.5}Al(OR^2)_{0.5}$;

dialkylaluminum halides such as diethylaluminum chloride, dibutylaluminum chloride and diethylaluminum bromide;

alkylaluminum sesquihalides such as ethylaluminum sesquichloride, butylaluminum sesquichloride and ethylaluminum sesquibromide;

partially halogenated alkylaluminum compounds such as alkylaluminum dihalides such as ethylaluminum dichloride, propylaluminum dichloride and butylaluminum dibromide;

dialkylaluminum hydrides such as diethylaluminum hydride and dibutylaluminum hydride;

partially hydrogenated alkylaluminum compounds such as alkylaluminum dihydride, for example, ethylaluminum dihydride and propylaluminum dihydride; and partially alkoxylated and halogenated alkylaluminum compounds such as ethylaluminum ethoxychloride, butylaluminum butoxychloride and ethylaluminum ethoxybromide.

Furthermore, the organoaluminum compounds similar to the above-mentioned compounds represented by formula (i) include organoaluminum compounds in which two or more aluminum atoms are bonded together via, for example, an oxygen atom or a nitrogen atom. Concrete examples of such compounds are as follows:

$(C_2H_5)_2AlOAl(C_2H_5)_2$, $(C_4H_9)_2AlOAl(C_4H_9)_2$, and $(C_2H_5)_2AlNAl(C_2H_5)_2$
   |
   $C_2H_5$ and methylaluminoxane.

Examples of the organoaluminum compounds having the formula (ii) include $LiAl(C_2H_5)_4$, and $LiAl(C_7H_{15})_4$.

Among the above-exemplified compounds, particularly preferred are trialkylaluminum compounds and alkylaluminum compounds in which two or more aluminum compounds are bonded together.

In the present invention, the electron donor [C] is used if necessary, in the preparation of the solid catalyst component for olefin polymerization. Examples of the electron donor [C] include oxygen-containing electron donors such as alcohols, phenols, ketones, aldehydes, carboxylic acids, esters of organic or inorganic acids, ethers, acid amides, acid anhydrides and alkoxysilanes, nitrogen-containing electron donors such as ammonia, amines, nitriles and isocyanates, and esters of polybasic carboxylic acids as described above.

Concrete examples of compounds which can be used as the electron donors include alcohols having 1 to 18 carbon atoms such as methanol, ethanol, propanol, pentanol, hexanol, octanol, dodecanol, octadecyl alcohol, oleyl alcohol, benzyl alcohol, phenylethyl alcohol, cumyl alcohol, isopropyl alcohol and isopropylbenzyl alcohol;

phenolic compounds having 6 to 20 carbon atoms, which may have a lower alkyl group, such as phenol, cresol, xylenol, ethylphenol, propylphenol, nonylphenol, cumylphenol and naphthol;

ketones having 3 to 15 carbon atoms, such as acetone, methyl ethyl ketone, methyl isobutyl ketone, acetophenone, benzophenone and benzoquinone;

aldehydes having 2 to 15 carbon atoms, such as acetaldehyde, propionaldehyde, octylaldehyde, benzaldehyde, toluylaldehyde and naphthoaldehyde;

esters of organic acids, having 2 to 30 carbon atoms, such as methyl formate, methyl acetate, ethyl acetate, vinyl acetate, propyl acetate, octyl acetate, cyclohexyl acetate, ethyl propionate, methyl butyrate, ethyl valerate, methyl chloroacetate, ethyl dichloroacetate, methyl methacrylate, ethyl crotonate, ethyl cyclohexanecarboxylate, methyl benzoate, ethyl benzoate, propyl benzoate, butyl benzoate, octyl benzoate, cyclohexyl benzoate, phenyl benzoate, benzyl benzoate, methyl toluylate, ethyl toluylate, amyl toluylate, ethyl ethylbenzoate, methyl anisate, n-butyl maleate, diisobutyl methylmalonate, di-n-hexyl cyclohexenedicarboxylate, diethyl nadate, diisopropyl tetrahydrophthalate, diethyl phthalate, diisobutyl phthalate, di-n-butyl phthalate, di-2-ethylhexyl phthalate, γ-butyrolactone, δ-valerolactone, coumarin, phthalide and ethylene carbonate;

acid halides having 2 to 15 carbon atoms, such as acetyl chloride, benzoyl chloride, toluylic acid chloride and anisic acid chloride;

ethers and diethers each having 2 to 20 carbon atoms, such as methyl ether, ethyl ether, isopropyl ether, butyl ether, amyl ether, tetrahydrofuran, anisole and diphenyl ether epoxy-p-menthane;

acid amides such as acetamide, benzamide and toluylic acid amide;

amines such as methylamine, ethylamine, diethylamine, tributylamine, piperidine, tribenzylamine, aniline, pyridine, picoline and tetramethylenediamine;

nitriles such as acetonitrile, benzonitrile and tolunitrile; and acid anhydrides such as acetic anhydride, phthalic anhydride and benzoic anhydride.

Organosilicon compounds represented by the following general formula [1] may also be used as the electron donor [C]

$$R_nSi(OR')_{4-n} \quad [1]$$

wherein R and R' represent each a hydrocarbon group and n is a number satisfying $0 \leq n < 4$.

Concrete examples of the organosilicon compounds represented by the general formula [1] include trimethylmethoxysilane, trimethylethoxysilane, dimethyldimethoxysilane, dimethyldiethoxysilane, diisopropyldimethoxysilane, t-butylmethyldimethoxysilane, t-butylmethyldiethoxysilane, t-amylmethyldiethoxysilane, diphenyldimethoxysilane, phenylmethyldimethoxysilane, diphenyldiethoxysilane, bis-o-tolyldimethoxysilane, bis-m-tolyldimethoxysilane, bis-p-tolyldimethoxysilane, bis-p-tolyldiethoxysilane, bisethylphenyldimethoxysilane, dicyclohexyldimethoxysilane, cyclohexylmethyldimethoxysilane, cyclohexylmethyldiethoxysilane, ethyltrimethoxysilane, ethyltriethoxysilane, vinyltrimethoxysilane, methyltrimethoxysilane, n-propyltriethoxysilane, decyltrimethoxysilane, decyltriethoxysilane, phenyltrimethoxysilane, γ-chloropropyltrimethoxysilane, methyltriethoxysilane, ethyltriethoxysilane, vinyltriethoxysilane, t-butyltriethoxysilane, n-butyltriethoxysilane, isobutyltriethoxysilane, phenyltriethoxysilane, γ-aminopropyltriethoxysilane, chlorotriethoxysilane, ethyltriisopropoxysilane, vinyltributoxysilane, cyclohexyltrimethoxysilane, cyclohexyltriethoxysilane, 2-norbornanetrimethoxysilane, 2-norbornanetriethoxysilane, 2-norbornanedimethyldimethoxysilane, ethyl silicate, butyl silicate, trimethylphenoxysilane, methyltriallyloxysilane, vinyltris(β-methoxyethoxysilane), vinyltriacetoxysilane and dimethyltetraethoxydisiloxane.

Among these compounds, preferred are ethyltriethoxysilane, n-propyltriethoxysilane, t-butyltriethoxysilane, vinyltriethoxysilane, phenyltriethoxysilane, vinyltributoxysilane, diphenyldimethoxysilane, phenylmethyldimethoxysilane, bis-p-tolyldimethoxysilane, p-tolylmethyldimethoxysilane, dicyclohexyldimethoxysilane, cyclohexylmethyldimethoxysilane, 2-norbornanetriethoxysilane, 2-norbornanemethyldimethoxysilane and diphenyldiethoxysilane.

Organosilicon compounds represented by the following general formula [2] may also be used as the electron donor [C]

$$SiR^1R^2{}_m(OR^3)_{3-m} \quad [2]$$

wherein $R^1$ is a cyclopentyl group or a cyclopentyl group having an alkyl group, $R^2$ is a member selected from the group consisting of an alkyl group, a cyclopentyl group and a cyclopentyl group having an alkyl group, $R^3$ is a hydrocarbon group, and m is a number satisfying $0 \leq m \leq 2$.

In the above-mentioned formula [2], $R^1$ is a cyclopentyl group or a cyclopentyl group having an alkyl group or groups, and examples of $R^1$ other than the cyclopentyl group include a cyclopentyl group having an alkyl group, such as 2-methylcyclopentyl, 3-methylcyclopentyl, 2-ethylcyclopentyl and 2,3-dimethylcyclopentyl.

Moreover, in the formula [2], $R^2$ is any of an alkyl group, a cyclopentyl group and a cyclopentyl group having an alkyl group. Examples of $R^2$ include an alkyl group such as methyl, ethyl, propyl, isopropyl, butyl and hexyl, and a cyclopentyl group and a cyclopentyl group having an alkyl group both having been illustrated as $R^1$.

Furthermore, in the formula [2], $R^3$ is a hydrocarbon group, and examples of the hydrocarbon group include an alkyl group, a cycloalkyl group, an aryl group and an aralkyl group.

Of the organosilicon compounds represented by the formula [2], preferred are those having a cyclopentyl group as $R^1$, an alkyl group or a cyclopentyl group as $R^2$ and an alkyl group, specifically a methyl group or an ethyl group, as $R^3$.

Concrete examples of the organosilicon compounds described above include trialkoxysilanes such as cyclopentyltrimethoxysilane, 2-methylcyclopentyltrimethoxysilane, 2,3-dimethylcyclopentyltrimethoxysilane and cyclopentyltriethoxysilane;

dialkoxysilanes such as dicyclopentyldimethoxysilane, bis(2-methylcyclopentyl)dimethoxysilane, bis(2,3-dimethylcyclopentyl)dimethoxysilane and dicyclopentyldiethoxysilane; and monoalkoxysilanes such as tricyclopentylmethoxysilane, tricyclopentylethoxysilane, dicyclopentylmethylmethoxysilane, dicyclopentylethylmethoxysilane, dicyclopentylmethylethoxysilane, cyclopentyldimethylmethoxysilane, cyclopentyldiethylmethoxysilane and cyclopentyldimethylethoxysilane. Of these electron donors, preferred are esters of organic carboxylic acids or organosilicon compounds, and particularly preferred are orgnaosilicon compounds. Examples of the other preferable compounds include diethers.

The first solid catalyst component [Ia] for olefin polymerization of the present invention is prepared by random prepolymerizing at least 2 types of α-olefin on the olefin polymerization catalyst comprising, as exemplified above, the solid titanium catalyst component [A], the organometallic catalyst component [B] of a metal belonging to Group I to III in the periodic table, and, if necessary, the electron donor [C]. The prepolymerization is carried out by prepolymerizing at least 2 types of α-olefin in an amount, based on 1 g of the solid titanium catalyst component [A], of 0.2 to 4000 g, preferably 1.0 to 4000 g, more preferably 1 to 3000 g, still more preferably 2 to 3000 g, particularly preferably 2 to 2000 g.

The catalyst concentration in the reaction system during the prepolymerization may be fairly high compared with that during the succeeding polymerization. The solid titanium catalyst component [A] is used in the prepolymerization in an amount, per liter of at least 2 types of α-olefin which will be described later, of usually 0.001 to 100 mmoles, preferably 0.01 to 50 mmoles, particularly preferably 0.01 to 20 mmoles in terms of titanium atom.

The organometallic compound catalyst component [B] is used in such an amount that the prepolymer is formed in an amount, based on 1 g of the solid titanium catalyst component [A], of 0.2 to 4000 g, preferably 1.0 to 4000 g.

The electron donor [C] is used, if necessary, in an amount, based on 1 mole of titanium atom in the solid titanium catalyst component [A], of usually 0.1 to 100 moles, preferably 0.5 to 50 moles, particularly preferably 1 to 30 moles.

The prepolymerization in the first invention is conducted, while the solid titanium catalyst component [A] as exemplified above is being suspended in a liquid α-olefin or α-olefins, by random copolymerizing at least 2 types of α-olefin including the above mentioned liquid α-olefin on the olefin polymerization catalyst described above.

At least two type of α-olefin is random copolymerized on the solid titanium catalyst component [A] by procedures, for example, illustrated hereinafter. As a first procedure, at least 2 types of α-olefin is random copolymerized. As a second procedure, at least 2 types of α-olefin is block copolymerized successively one type after another. Moreover, as a third procedure, a single type of α-olefin is homopolymerized at first, and then at least 2 types of α-olefin is copolymerized. Of these procedures, the first and third procedures are preferable, and the first procedure is particularly preferable.

The at least two types of olefin used in the prepolymerization may be either the same with or different from olefin used in polymerization as will be described later, and α-olefin having 2 to 10 carbon atoms is preferably employed.

Examples of the α-olefin of 2 to 10 carbon atoms include ethylene propylene, 1-butene, 1-pentene, 3-methyl-1-butene, 4-methyl-1-pentene, 3-methyl-1 pentene, 1-heptene, 1-octene and 1-decene. Of these compounds, α-olefin having 2 to 6 carbon atoms is preferably employed.

In the first invention, it is especially preferable that ethylene and propylene are random prepolymerized on the olefin polymerization catalyst as described above. It is desirable that propylene and ethylene are copolymerized in the prepolymerization in such a manner that there are obtained a prepolymer composed of 70 to 98 mol % of propylene units and 30 to 2 mol % of ethylene units in order to prepare especially polymer particles containing a large amount of an amorphous olefin polymer portion and having good granular properties, for example, polymer particles containing not less than 30% by weight of an amorphous olefin polymer portion and having good granular properties.

The reaction temperature during the prepolymerization is usually −20° to 100° C., preferably −20° to 80° C., particularly preferably 0° to 40° C.

Furthermore, a molecular weight adjusting agent such as hydrogen may also be used in the prepolymerization. Such a molecular weight adjusting agent is desirably used in such an amount that the polymer obtained by the prepolymerization has an intrinsic viscosity [η] of about not less than 0.2 dl/g, preferably about 1 to 20 dl/g as measured in decalin at 135° C.

The prepolymerization as described above can be performed batch-wise or continuously.

The second solid catalyst component [Ib] for olefin polymerization of the present invention is formed by prepolymerizing at least 2 types of α-olefin on the olefin polymerization catalyst comprising

[A] a solid titanium catalyst component comprising magnesium, titanium and halogen as essential ingredients, and, if necessary, an electron donor,

[B] an organometallic catalyst component of a metal belonging to Group I to III in the periodic table, and, if necessary,

[C] an electron donor, and being in suspension in a hydrocarbon solvent [D], wherein at least two types of α-olefin is prepolymerized on said olefin polymerization catalyst, in an amount of 0.2 to 2000 g, based on 1 g of said solid titanium catalyst component [A].

Components similar to those [A] to [C] exemplified before can be illustrated as the solid titanium catalyst component [A], the organometallic compound catalyst component [B] and the electron donor [C].

The second solid catalyst component [Ib] for olefin polymerization of the present invention is formed by random prepolymerizing at least two types of α-olefin on an olefin polymerization catalyst comprising the solid titanium catalyst component [A], the organometallic catalyst component [B] of a metal belonging to Group I to III in the periodic table and, if necessary, the electron donor [C]. The prepolymerization is carried out by prepolymerizing at least 2 types of α-olefin in an amount, based on 1 g of the solid titanium catalyst component [A], of 0.2 to 2000 g, preferably 1.0 to 2000 g, more preferably 1 to 1000 g, still more preferably 2 to 500 g, particularly preferably 2 to 200 g.

The catalyst concentration in the reaction system during the prepolymerization may be fairly high compared with that during the succeeding polymerization.

The solid titanium catalyst component [A] is used in the prepolymerization in an amount, per liter of an inert hydrocarbon medium which will be described later, of usually 0.001 to 100 mmoles, preferably 0.01 to 50 mmoles, particularly preferably 0.1 to 20 mmoles in terms of titanium atom.

The organometallic compound catalyst component [B] is used in such an amount that the prepolymer is formed in an amount, based on 1 g of the solid titanium catalyst component [A], of 0.2 to 2000 g, preferably 1.0 to 2000 g.

The electron donor [C] is used, if necessary, in an amount, based on 1 mole of titanium atom in the solid titanium catalyst component [A], of 0.1 to 50 moles, preferably 0.5 to 30 moles, particularly preferably 1 to 10 moles.

The prepolymerization in the present invention is conducted, while the solid titanium catalyst component [A] as exemplified above is being suspended in the inert hydrocarbon solvent [D], by random copolymerizing at least 2 types of α-olefin.

At least 2 types of α-olefin is random copolymerized on the solid titanium catalyst component [A] by procedures, for example, illustrated hereinafter. As a first procedure, at least 2 types of α-olefin is random copolymerized. As a second procedure, at least 2 types of α-olefin is block copolymerized successively one type after another. Moreover, as a third procedure, a single type of α-olefin is homopolymerized at first, and then at least 2 types of α-olefin is copolymerized. Of these procedures, the first and third procedures are preferable, and the first procedure is particularly preferable.

Concrete examples of the hydrocarbon solvent [D] used herein include:

straight chain or branched chain aliphatic hydrocarbons such as propane, butane, pentane, hexane, heptane, octane, decane, dodecane and kerosene;

alicyclic hydrocarbons such as cyclopentane, cyclohexane and methylcyclopentane;

aromatic hydrocarbons such as benzene, toluene and xylene; and halogenated hydrocarbons such as ethylene chloride and chlorobenzene, or a mixture thereof. Of these inert hydrocarbon solvents, aliphatic hydrocarbons are especially preferred.

The at least two types of olefin used in the prepolymerization may be either the same with or different from olefin used in polymerization as will be described later, and α-olefin having 2 to 10 carbon atoms is preferably employed.

Examples of the α-olefin of 2 to 10 carbon atoms include ethylene, propylene, 1-butene, 1-pentene, 3-methyl-1-butene, 4-methyl-1-pentene, 3-methyl-1-pentene, 1-heptene, 1-octene and 1-decene. Of these compounds, α-olefin having 2 to 6 carbon atoms is preferably employed.

In the second invention, it is especially preferable that ethylene and propylene are random prepolymerized on the olefin polymerization catalyst as described above. It is desirable that the prepolymerization is carried out by copolymerizing propylene and ethylene in a gas mixture containing, for example, 70 to 98 mol % of propylene and 30 to 2 mol % of ethylene in order to prepare especially polymer particles containing a large amount of an amorphous olefin polymer portion and having good granular properties, for example, polymer particles containing not less than 30% by weight of an amorphous olefin polymer portion and having good granular properties.

The reaction temperature during the prepolymerization is usually $-20°$ to $100°$ C., preferably $-20°$ to $80°$ C., particularly preferably $0°$ to $40°$ C.

Furthermore, a molecular weight adjusting agent such as hydrogen may also be used in the prepolymerization. Such a molecular weight adjusting agent is desirably used in such an amount that the polymer obtained by the prepolymerization has an intrinsic viscosity $[\eta]$ of about not less than 0.2 dl/g, preferably about 1 to 20 dl/g as measured in decalin at 135° C.

As described above, when the solid catalyst component [Ib] for olefin polymerization is prepared by random prepolymerizing at least two α-olefin on the olefin polymerization catalyst comprising the solid titanium catalyst component [A], the organometallic compound catalyst component [B] and, if necessary, the electron donor [C] while suspended in the hydrocarbon solvent [D], at least a portion of the prepolymer formed in the prepolymerization process is dissolved in the above-mentioned hydrocarbon solvent [D]. The prepolymer formed in the prepolymerization process remains in the thus obtained solid catalyst component [Ib] for olefin polymerization in an amount of not greater than 98% by weight, preferably 97 to 60% by weight, more preferably 96 to 70% by weight, particularly preferably 94 to 80% by weight.

In addition, the amount, based on 1 g of the solid titanium catalyst component [A], of the prepolymer remaining in the catalyst component [Ib] for olefin polymerization is determined by a procedure described below.

After prepolymerization, the solvent suspension containing the prepolymerization catalyst is separtated by filtering. The residual solid portion is dried, and the weight [Ws] of of the solid portion is obtained. The filtrate is similarly dried, and the amount [WL] of the polymer dissolved in the filtrate is obtained on the assumption that the organometallic compound component and the electron donor component both having been initially placed entirely exist in the filtrate. There can be obtained from these values the amount of the prepolymer, based on 1 g of the solid titanium catalyst component [A], remaining in the olefin polymerization catalyst component [Ib].

In addition, the operation of dissolving a part of the polymer into the solvent as described above is not always required to be performed in the prepolymerization process. A part of the polymer may also be dissolved in the solvent after prepolymerization by raising the temperature of the hydrocarbon solvent or by employing a solvent in which the polymer tends to be dissolved easily.

The prepolymerization as described above can be performed by batch process or continuous process. Of these processes, the batch process is preferable.

During the polymerization of olefin, there is used the olefin polymerization catalyst comprising
the solid catalyst component [Ia] or [Ib] for olefin polymerization prepared as described above,
the organometallic compound catalyst component [II] of a metal belonging to Group I to III in the periodic table, and, if necessary,
the electron donor [III].

A substance similar to the organometallic compound catalyst component [B] of a metal belonging to Group I to III in the periodic table, which has been used for preparing the solid catalyst component [Ia] or [Ib] for olefin polymerization, is used as the organometallic compound catalyst component [II] of a metal belonging to Group I to III in the periodic table. However, the organometallic compound catalyst component [II] is not necessarily the same with the organometallic compound catalyst component [B].

A substance similar to the electron donor [C] which has been used for preparing the olefin polymerization solid catalyst component [Ia] or [Ib] is employed as the electron donor [III]. However, the electron donor [III] is not necessarily the same with the electron donor [C].

The polymerization of olefin is carried out by using the olefin polymerization catalysts as described above. Examples of olefin used in the polymerization include olefin having 2 to 20 carbon atoms, such as ethylene, propylene, 1-butene, 1-pentene, 3-methyl-1-butene, 4-methyl-1-pentene, 3-methyl-1-pentene and 1-octene.

In the present invention, the polymerization of olefin is conducted in the gas phase or in the slurry state.

In the case where the polymerization is conducted in a reaction form of slurry polymerization, inert hydrocarbon may be used as the reaction solvent, or olefin which is liquid at the reaction temperature may also be used.

Concrete examples of inert hydrocarbons include:

straight or branched chain aliphatic hydrocarbons such as propane, butane, pentane, hexane, heptane, octane, decane, dodecane and kerosene;

alicyclic hydrocarbons such as cyclopentane, cyclohexane and methylcyclopentane;

aromatic hydrocarbons such as benzene, toluene and xylene; and halogenated hydrocarbons such as ethylene chloride and chlorobenzene, or a mixture thereof. Of these inactive hydrocarbon media, the aliphatic hydrocarbons are especially preferable.

In the polymerization process of the invention, the solid catalyst component [Ia] or [Ib] is used in an amount, per liter of the polymerization volume, of usually about 0.0001 to 0.5 mmole, preferably about 0.005 to 0.1 mmole in terms of Ti atom. Moreover, the organometallic compound catalyst component [II] is used in an amount, based on 1 mole of the Ti atoms in the prepolymerizatioon catalyst component in the polymerization system, of about 1 to 2000 moles, preferably about 5 to 500 moles in terms of the metal atoms. Furthermore, the electron donor [III] is used in an amount, based on 1 mole of the metal atoms in the organometallic compound catalyst component [II], of usually about 0.001 to 10 moles, preferably about 0.01 to 2 moles, particularly preferably about 0.05 to 1 mole.

When hydrogen is used during the polymerization, the molecular weight of the resultant polymers can be controlled, and polymers having a high melt flow rate can be obtained.

In the present invention, the polymerization of olefin is conducted at temperature of usually about 0° to 130° C., preferably about 20° to 100° C., under pressure of usually normal pressure to 100 kg/cm², preferably about 2 to 50 kg/cm². In the polymerization process of the present invention, the polymerization is carried out by any of a batch process, a semicontinuous process and a continuous process. The polymerization may also be carried out in at least two steps by altering the reaction conditions.

Furthermore, in the present invention, the polymerization may also be carried out in at least two steps by altering the reaction conditions. Especially in the present invention, in the case of preparing polymer particles containing a crystalline olefin polymer portion and an amorphous olefin polymer portion, for example, preferably by singly polymerizing an α-olefin such as propylene on an olefin polymerization catalyst to form a crystalline olefin polymer portion at first, and then random copolymerizing at least two type of α-olefin such as propylene and ethylene to form an amorphous olefin polymer portion.

More concretely, examples of the processes in the present invention for preparing polymer particles include a process wherein at least two types of monomers used as a raw material are fed to a polymerization vessel to simultaneously form a crystalline olefin polymer portion and an amorphous olefin polymer portion; and a process wherein at least two polymerization vessels are employed, and a crystalline polymer porition and an amorphous polymer portion are formed separately and in series. From the standpoint of freely varying the molecular weight, composition and amount of the amorphous olefin polymer portion, the latter process is preferable.

Examples of the most preferable processes include a process wherein a crystalline olefin polymer portion is formed by gas phase polymerization, and then an amorphous olefin polymer portion is formed by gas phase polymerization; or a process wherein a crystalline olefin polymer portion is formed in a monomer solvent, and then an amorphous polymer portion is formed by gas phase polymerization. Polymer particles having significantly improved granular properties can be obtained by adding a reaction agent such as oxygen and alcohol especially in the gas phase polymerization process.

When (co)polymerization of olefin is carried out by using olefin polymerization catalysts as described above, there can be prepared olefin polymer particles having good granular properties, especially olefin polymer particles having no blocking formation properties, good particle size distribution and excellent granular properties even when they contain a large amount of an amorphous olefin polymer portion.

Furthermore, in the present invention, the polymer can be obtained in a high yield, based on the olefin polymerization catalyst, and therefore the catalyst residue, especially the halogen content in the polymer can be relatively decreased. Accordingly, an operation for removing catalyst in the polymer can be omitted, and rust formation on a mold during molding the thus formed olefin polymer can be effectively prevented.

EFFECT OF THE INVENTION

According to the present invention, there can be manufactured olefin polymer particles having low adhesive among the polymer particles as well as good particle distribution and excellent granular properties even when they contain a large amount of an amorphous olefin polymer portion.

The present invention is illustrated below with reference to the following examples, but it should be construed that the invention is in no way limited to those examples.

EXAMPLE 1

Preparation of catalyst component [A]

A 2-liter high-speed agitator (manufactured by Tokushu Kika Kogyo K.K.) was thoroughly purged with nitrogen ($N_2$) and charged with 700 ml of refined kerosine, 10 g of commercially available $MgCl_2$, 24.2 g of ethanol and 3 g of Emasol 320 (trade name, a product of Kao Atlas K.K., sorbitan distearate), followed by elevating the temperature of the reaction system with stirring. The mixture was stirred at 800 rpm at the temperature of 120° C. for 30 minutes, and then transferred by means of a Teflon tube having an inner diameter of 5 mm to a 2-liter glass flask (equipped with a stirrer) charged with 1 liter of refined kerosine previously cooled to −10° C. under high-speed stirring. The resulting solid was collected by filtration and thoroughly washed with hexane to obtain a carrier.

After 7.5 g of said carrier was suspended in 150 ml of titanium tetrachloride at room temperature, 1.3 ml of diisobutyl phthalate was added and the temperature of the system was raised to 120 ° C. The mixture was mixed with stirring at 120° C. for 2 hours. Solid in the mixture was then collected by filtration and again suspended in 150 ml of titanium tetrachloride, followed by mixing with stirring at 130° C. for 2 hours. The solid obtained by the reaction was collected from the reaction mixture by filtration and washed with a sufficient amount of refined hexane to obtain a solid catalyst component [A]. The component contained 2.2% by weight of titanium, 63% by weight of chlorine, 20% by weight of magnesium and 5.5% by weight of diisobutyl phthalate. There was a perfectly spherical catalyst component having an average particle size of 64 μm and a geometrical standard deciation ($\delta_g$) in particle size distribution of 1.5.

Preparation of solid catalyst component [I a-1] for olefin polymerization

The catalyst component [A] was subjected to prepolymerization in the following manner.

A 2-liter stainless steel polymerizer purged with nitrogen was charged with 0.25 kg of propylene and 7 liters of ethylene gas at room temperature, and then with 1.8 mmol of triethylaluminum, 0.18 mmol of cyclohexylmethyldimethoxysilane and 0.006 mmol (in terms of titanium atom) of the above Ti catalyst component [A]. Pre-polymerization was carried out for 10 minutes while keeping the reaction system at room temperature. After completion of the pre-polymerization for 10 minutes, the vent valve of the polymerizer was opened, and propylene and ethylene gas were purged from the polymerizer until the pressure within the polymerizer reached atmospheric pressure.

It was confirmed that the solid catalyst component [I a-1] for olefin polymerization obtained in the manner mentioned above contained about 1360 g of a polymer per 1 g of the Ti catalyst component [A] by the analystical results of the other solid catalyst component which was prepared under the same conditions as those described above.

Preparation of copolymer

To a 2-liter polymerizer containing the solid catalyst component [I a-1] for olefin polymerization were added 0.5 kg of propylene and 1 Nl of hydrogen, followed by elevating the temperature of the system. The temperature within the polymerizer was kept at 70° C. to carry out the homopolymerization of propylene. Twenty minutes after the temperature reached 70° C., the vent valve of the polymerizer was opened, and propylene was purged from the polymerizer until the pressure within the polymerizer reached atmospheric pressure.

After completion of purging, copolymerization was carried out. Namely, ethylene at a rate of 80 Nl/hr, propylene at a rate of 120 Nl/hr and hydrogen at a rate of 3.1 Nl/hr were fed to the polymerizer. The opening of the vent valve was ajusted so that the pressure within the polymerizer was kept at 10 kg/cm$^2$G. The temperature was kept at 70° C. during copolymerization, and the copolymerization time was 70 minutes. After the lapse of the copolymerization time, gas within the polymerizer was purged to thereby terminate the copolymerization. The physical properties of the resulting copolymer are shown in Table 1.

EXAMPLE 2

Preparation of solid catalyst component [I a-2] for olfin polymerization

The procedure of Example 1 was repeated except that the amount of ethylene gas charged in the pre-polymerization of the same catalyst component [A] as that was used in Example 1 was 3.5 l.

It was confirmed that the solid catalyst component [I a-2] for olefin polymerization obtained in the manner mentioned above contained about 960 g of a polymer per 1 g of the Ti catalyst component [A] by the analystical results of the other solid catalyst component which was prepared under the same conditions as those described above.

Preparation of copolymer

The copolymerization of Example 1 was repeated except that the solid catalyst component [I a-2] for olefin polymerization obtained above was used. The physical properties of the resulting copolymer are shown in Table 1.

EXAMPLE 3

Preparation of solid catalyst component [I a-3] for olefin polymerization

The procedure of Example 1 was repeated except that dicyclopentyldimethoxysilane was used in place of cyclohexymethyldilethoxysilane in the pre-polymerization of the catalyst component [A] used in Example 1.

It was confirmed that the solid catalyst component [I a-3] for olefin polymerization obtained in the manner described above contained about 1200 g of a polymer per 1 g of the Ti catalyst component [A] by the analytical results of the other solid catalyst component which was prepared under the same conditions as those described above.

Preparation of copolymer

The copolymerization of Example 1 was repeated except that the solid catalyst component [I a-3] for olefin polymerization obtained above was used and the copolymerization time was 60 minutes. The physical properties of the resulting copolymer are shown in Table 1.

COMPARATIVE EXAMPLE 1

Preparation of pre-polymerized catalyst [Comp. 1]

The procedure of Example 1 was repeated except that ethylene gas was not charged in the pre-polymerization of the catalyst component [A] used in Example 1 and the pre-polymerization time was 20 minutes to obtain a pre-polymerized catalyst [Comp. 1].

Preparation of copolymer

The coplymerization of Example 1 was repeated except that the pre-polymerized catalyst [Comp. 1] was used, the homopolymerization of propylene was carried out for 40 minutes and the copolymerization time was 120 minutes. The physical properties of the resulting copolymer are shown in Table 1.

COMPARATIVE EXAMPLE 2

Preparation of pre-polymerized catalyst [Comp. 2]

The procedure of Example 1 was repeated except that ethylene gas was not charged in the pre polymerization of the catalyst component [A] used in Example 1 to obtain a prepolymerized catalyst [Comp. 2].

Preparation of copolymer

The copolymerization of Example 1 was repeated except that the pre-polymerized catalyst [Comp. 2] was used, the homopolymerization of propylene was carried out for 40 minutes and the copolymerization time was 100 minutes. The physical properties of the resulting copolymer are shown in Table 1.

TABLE 1

| Physical properties | Physical properties of copolymer particles obtained | | | | |
|---|---|---|---|---|---|
| | Example 1 | Example 2 | Example 3 | Comp. Ex. 1 | Comp. Ex. 2 |
| MFR (g/10 min) | 1.3 | 1.8 | 2.1 | 1.3 | 2.2 |
| Ethylene content (mol %) | 34 | 36 | 26 | 32 | 30 |
| 23° C. n-decane-solubles | | | | | |
| wt. % | 46 | 45 | 43 | 45 | 43 |
| [η] dl/g | 2.57 | 2.79 | 2.57 | 2.72 | 2.50 |
| Ethylene content (mol %) | 41 | 45 | 45 | 41 | 40 |
| Apparent bulk specific gravity* (g/ml) | | | | | |
| A | 0.42 | 0.42 | 0.43 | 0.38 | 0.38 |

TABLE 1-continued

| | Physical properties of copolymer particles obtained | | | | |
|---|---|---|---|---|---|
| Physical properties | Example 1 | Example 2 | Example 3 | Comp. Ex. 1 | Comp. Ex. 2 |
| B | 0.39 | 0.38 | 0.40 | could not be measured | could not be measured |
| Drop time (seconds) | | | | | |
| A | 10.2 | 10.8 | 9.3 | 14.6 | 14.2 |
| B | 10.0 | 10.8 | 9.7 | not flowed | not flowed |

*A: Undried powder
B: Powder dried at 100° C. for one hour

EXAMPLE 4

Preparation of solid catalyst component [Ib-1] for olefin polymerization

The catalyst component [A] was subjected to pre-polymerization in the following manner.

A 400 ml glass polymerizer purged with nitrogen was charged with 200 ml of refined hexane and then with 0.66 mmol of triethylaluminum, 0.13 mmol of cyclohexylmethyldimethoxysilane and 0.066 mmol (in terms of titanuim atom) of the above-described Ti catalyst component [A]. Subsequently, propylene gas at a rate of 4.5 Nl/hr and ethylene gas at a rate of 0.5 Nl/hr were fed to the liquid phase zone in the polymerizer while carrying out mixing. The temperature during pre-polymerization was kept at 20° C.±2°. After the pre-polymerization, a liquid phase was removed by filtration, and the separated solid phase was again suspended in decane.

The analysis showed that the solid catalyst component [Ib-1] for olefin polymerization obtained in the manner mentioned above contained about 92 g of a polymer per 1 g of the Ti catalyst component [A], and the amount of the polymer dissolved out into the solvent during the pre-polymlerization was equivalent to 6.2 g per 1 g of the Ti catalyst component [A].

Preparation of copolymer

To a 2-liter polymerizer were added 0.5 kg of propylene and 1 Nl of hydrogen, followed by elevating the temperature in the polymerizer. Subsequently, 1.8 mmol of triethylaluminum, 0.18 mmol of cyclohexylmethyldimethoxysilane and 0.006 mmol (in terms of titanuim atom) of the solid catalyst component [Ib-1] for olefin polymerization were added thereto at 60° C. The temperature within the polymerizer was then kept at 70° C. to carry out the homopolymerization of propylene. Fourty minutes after the temperature reached at 70° C., the vent valve of the polymerizer was opened, and propylene was purged from the polymerizer until pressure within the polymerizer reached atomospheric pressure.

After completion of pruging, compolymerization was carried out. Namely, ethylene at a rate of 80 Nl/hr, propylene at a rate of 120 Nl/hr and hydrogen at a rate of 3.1 Nl/hr were fed to the polymerizer. The opening of the vent valve of the polymerizer was adjusted so that pressure within the polymerizer was kept at 10 $kg/cm^2 \cdot G$. The temperature was kept at 70° C. during the copolymerization, and the copolymerization time was 90 minutes. After the lapse of the copolymerization time, gas was purged from the polymerizer to thereby terminate the copolymerization. The physical properties of the resulting copolymer are shown in Table 2.

EXAMPLE 5

Preparetion of solid catalyst component [Ib-2] for olefin polymerization

The catalyst component [A] used in Example 1 was subjected to pre-polymerization in the following manner.

A 400 ml glass polymerizer purged with nitrogen was charged with 200 ml of refined hexane, and then with 5 mmol of triethylaluminum, 1 mmol of cyclohexylmethyldimethoxysilane and 0.5 mmol (in terms of titanium atom) of the above-described Ti catalyst component [A]. Subsequently, propylene gas at a rate of 18 Nl/hr and ethylene gas at a rate of 2 Nl/hr were fed to the liquid phase zone in the polymerizer over a period of 70 minutes while mixing them. The temperature during pre-polymerization was kept at 20° C.±2°. After the pre-polymerization, the liquid phase was removed by filtration, and the separated solid phase was again suspended in decane.

The analysis showed that the solid catalyst component [Ib-2] for olefin polymerization contained about 37 g of a polymer per 1 g of the Ti catalyst component [A], and the amount of the polymer dissolved out into the solvent during the pre-polymerization was equivalent to about 2.5 g per 1 g of the Ti catalyst component [A] used.

Preparation of copolymer

The procedure of Example 4 was repeated except that the solid catalyst component [Ib-2] for olefin polymerization obtained above was used and the copolymerization time was 50 minutes. The physical properties of the resulting copolymer are shown in Table 2.

COMPARATIVE EXAMPLE 3

Preparation of pre-polymerize catalyst [Comp. 3]

The procedure of Example 1 was repeated except that propylene gas alone was used at a rate of 4.4 Nl/hr as the monomer to be fed in place of propylene gas and ethylene gas in the pre-polymerization of the catalyst component [A] used in Example 1 to obtain a pre-polymerized catalyst [Comp. 3].

Preparation of copolymer

The copolymerization of Example 4 was repeated except that the pre-polymerized catalyst [Comp. 3] was used. the physical properties of the resulting copolymer are shown in Table 2.

COMPARATIVE EXAMPLE 4

Preparation of pre-polymerized catalyst [Comp. 4]

The procedure of Example 5 was repeated except that propylene gas alone was sued at a rate of 19 Nl/hr as the monomer to be fed in place of propylene gas and ethylene gas in the pre-polymerization of the catalyst component [A] used in Example 5 to obtain a pre-polymerized catalyst [Comp. 4].

Preparation of copolymer

The copolymerization of Example 5 was repeated except that the pre-polymerized catalyst [Comp. 4] was used. The physical properties of the resulting copolymer are shown in Table 2.

EXAMPLE 6

Preparation of solid catalyst component [Ib-3] for olefin polymerization

The procedure of Example 5 was repeated except that propylene gas at a rate of 12.3 Nl/hr and ethylene gas at a rate of 3.1 Nl/hr were fed to the polymerizer in the pre-polymerization of the catalyst component [A] used in Example 5.

The analysis showed that the pre-polymerized solid catalyst component [Ib-3] for olefin polymerization obtained in the manner mentioned above contained about 26 g of a polymer per 1 g of the Ti catalyst component [A], and the amount of the polymer dissolved out into the solvent during the pre-polymerization was equivalent to about 3.0 g per 1 g of the Ti catalyst component [A].

Preparation of copolymer

The procedure of Example 4 was repeated except pre-polymerization, the liquid phase was removed by filtration, and the separated solid phase was again suspended in decane.

The analysis showed that the pre-polymerized solid catalyst component [Ib-4] for olefin polymerization obtained in the manner mentioned above contained about 88 g of a polymer per 1 g of the Ti catalyst component [A], and the amount of the polymer dissolved out into the solvent during the pre-polymerization was equivalent to about 4.0 g per 1 g of the Ti catalyst component [A].

Preparation of copolymer

The copolymerization of Example 4 was repeated except that the solid catalyst component [Ib-4] for olefin polymerization was used. The physical properties of the resulting copolymer are shown in Table 2.

Copolymer particles were dried in the following manner.

A tubular round bottom flask made of glass, which was equipped with a double helical agitating blade made of stainless steel (10 mm width), had an inner diameter of 95 mm and was 200 mm in depth, was charged with 100 g of copolymer particles. The particles in the flask were dried in an oil bath at 100° C. while stirring them at a speed of about 30 rpm. The drying was carried out in a nitrogen atmosphere. After drying for one hour, the copolymler particles were taken out and cooled to room temperature.

TABLE 2

| Physical properties | Physical properties of copolymer particles obtained ||||||
|---|---|---|---|---|---|---|
| | Example 4 | Example 5 | Example 6 | Example 7 | Comp. Ex. 3 | Comp. Ex. 4 |
| MFR (g/10 min) | 1.2 | 1.6 | 1.8 | 0.5 | 2.5 | 1.50 |
| Ethylene content (mol %) | 34 | 25 | 28 | 33 | 30 | 19 |
| 23° C. n-decane-solubles | | | | | | |
| wt. % | 46 | 32 | 36 | 44 | 43 | 31 |
| [η] dl/g | 2.70 | 2.38 | 2.55 | 3.61 | 2.50 | 2.80 |
| Ethylene content (mol %) | 42 | 40 | 40 | 41 | 39 | 39 |
| Apparent bulk specific gravity* (g/ml) | | | | | | |
| A | 0.41 | 0.42 | 0.41 | 0.41 | 0.42 | 0.42 |
| B | 0.41 | 0.41 | 0.40 | 0.41 | could not be measured | 0.39 |
| Drop time (seconds) | | | | | | |
| A | 10.3 | — | — | — | 14.2 | — |
| B | 10.6 | 9.9 | 10.9 | 11.0 | not flowed | 18.9 |

*A: Undried powder
B: Powder dried at 100° C. for one hour that the solid catalyst component [Ib-3] for olefin polymerization was used and the copolymerization time was 70 minutes. The physical properties of the resulting copolymer are shown in Table 2.

EXAMPLE 7

Preparation of solid catalyst component [Ib-4] for olefin polymerization

The catalyst component [A] was subjected th pre-polymerization in the following manner.

A 400 ml glass polymerizer purged with nitrogen was charged with 200 ml of refined hexane and then with 0.66 mmol of triethylanuminum, 0.13 mmol of dicyclopentyldimethoxysilane and 0.066 mmol (in terms of titanium atom) of the above-descrilbed Ti catalyst component [A]. Subsequently, the polymerizer was charged with 3.73 ml of hexene-1 and propylene gas at a rate of 3.6 Nl/hr was fed to the liquid phase zone of the polymerizer over a period of 100 minutes. The pre-polymerization temperature was kept at 20° C.±2°. After the

What is claimed is:

1. An olefin polymerization catalyst comprising
   (Ia) a solid catalyst component for olefin polymerization formed by prepolymerization of olefin on an olefin polymerization catalyst comprising
     a solid titanium catalyst component (A) comprising magnesium, titanium and halogen as its essential ingredients,
     an organometallic compound catalyst component (B) of a metal belonging to Groups I and III in the periodic table, and
     an electron donor (C) selected from the group consisting of diethers having 3 to 20 carbon atoms and organosilicon compounds represented by the formula $R_n Si(OR')_{4-n}$      (1)

wherein R and R' represent each a hydrocarbon group and n is a number satisfying $0 \leq n < 4$, and being in suspension in a liquid α-olefin, wherein propylene and at least one α-olefin having 2 to 6 carbon atoms other than propylene are prepolymerized on said olefin polymerization catalyst, in an amount of from 0.2 to 4,000 g, based on 1 g of said solid titanium catalyst component (A), the prepolymer being composed of 70 to 98 mol % of propylene units and 30 to 2 mol % of units of said α-olefin having 2 to 6 carbon atoms other than propylene, and having an intrinsic viscosity ($\eta$), as measured in decalin at 135° C., of from 0.2 to 20 dl/g, and (II) an organometallic compound catalyst component of a metal belonging to Groups I and III in the periodic table.

2. An olefin polymerization catalyst comprising (Ia) a solid catalyst component for olefin polymerization formed by prepolymerization of olefin on an olefin polymerization catalyst comprising a solid titanium catalyst component (A) comprising magnesium, titanium and halogen as its essential ingredients, and an organometallic compound catalyst component (B) of a metal belonging to Groups I and III in the periodic table, and being in suspension in a liquid α-olefin, wherein propylene and at least one α-olefin having 2 to 6 carbon atoms other than propylene are prepolymerized on said olefin polymerization catalyst, in an amount of from 0.2 to 4,000 g, based on 1 g of said solid titanium catalyst component (A), the prepolymer being composed of 70 to 98 mol % of propylene units and 30 to 2 mol % of units of said α-olefin having 2 to 6 carbon atoms other than propylene, and having an intrinsic viscosity ($\eta$), as measured in decalin at 135° C., of from 0.2 to 20 dl/g, and (II) an organometallic compound catalyst component of a metal belonging to Groups I and III in the periodic table, and (III) an electron donor selected from the group consisting of diethers having 3 to 20 carbon atoms and organosilicon compounds represented by the formula $$R_n Si (OR')_{4-n} \qquad (1)$$

wherein R and R' represent each a hydrocarbon group and n is a number satisfying $0 \leq n < 4$.

3. An olefin polymerization catalyst comprising (Ia) a solid catalyst component for olefin polymerization formed by prepolymerization of olefin on an olefin polymerization catalyst comprising a solid titanium catalyst component (A) comprising magnesium, titanium and halogen as its essential ingredients, an organometallic compound catalyst component (B) of a metal belonging to Groups I and III in the periodic table, and an electron donor (C) selected from the group consisting of diethers having 3 to 20 carbon atoms and organosilicon compounds represented by the formula $$R_n Si (OR')_{4-n} \qquad (1)$$

wherein R and R' represent each a hydrocarbon group and n is a number satisfying $0 \leq n < 4$, and being in suspension in a liquid α-olefin, wherein propylene and at least one α-olefin having 2 to 6 carbon atoms other than propylene are prepolymerized on said olefin polymerization catalyst, in an amount of from 0.2 to 4,000 g, based on 1 g said solid titanium catalyst component (A), the prepolymer being composed of 70 to 98 mol % of propylene units and 30 to 2 mol % of units of said α-olefin having 2 to 6 carbon atoms other than propylene, and having an intrinsic viscosity ($\eta$), as measured in decalin at 135° C., of from 0.2 to 20 dl/g, (II) an organometallic compound catalyst component of a metal belonging to Groups I and III in the periodic table, and (III) an electron donor selected from the group consisting of diethers having 3 to 20 carbon atoms and organosilicon compounds represented by the formula $$R_n Si (OR')_{4-n} \qquad (1)$$

wherein R and R' and n have the same meanings as defined above.

4. On olefin polymerization catalyst as claimed in claim 1, 2 or 3, wherein said solid titanium catalyst component (A) further comprises an electron donor.

5. An olefin polymerization catalyst comprising (Ib) a solid catalyst component for olefin polymerizaiton formed by prepolymerization of olefin on an olefin polymerization catalyst comprising a solid titanium catalyst component (A) comprising magnesium, titanium and halogen as its essential ingredients, an organometallic compound catalyst component (B) of a metal belonging to Groups I and III in the periodic table, and an electron donor (C) selected from the group consisting of diethers having 3 to 20 carbon atoms and organosilicon compounds represented by the formula $$R_n Si (OR')_{4-n} \qquad (1)$$

wherein R and R' represent each a hydrocarbon group and n is a number satisfying $0 \leq n < 4$, and being in suspension in a liquid hydrocarbon solvent (D), wherein propylene and at least one α-olefin having 2 to 6 carbon atoms other than propylene are prepolymerized on said olefin polymerization catalyst, in an amount of from 0.2 to 4,000 g, based on 1 g of said solid titanium catalyst component (A), the prepolymer being composed of 70 to 98 mol % of propylene units and 30 to 2 mol % of units of said α-olefin having 2 to 6 carbon atoms other than propylene, and having an intrinsic viscosity ($\eta$), as measured in decalin at 135° C., of from 0.2 to 20 dl/g, and (II) an organometallic compound catalyst component of a metal belonging to Groups I and III in the periodic table.

6. An olefin polymerization catalyst comprising (Ib) a solid catalyst component for olefin polymerization formed by prepolymerization of olefin on an olefin polymerization catalyst comprising a solid titanium catalyst component (A) comprising magnesium, titanium and halogen as its essential ingredients, and an organometallic compound catalyst component (B) of a metal belonging to Groups I and III in the periodic table, and being in suspension in a liquid hydrocarbon solvent (D), wherein propylene and at least one α-olefin having 2 to 6 carbon atoms other than propylene are prepolymerized on said olefin polymerization catalyst, in an amount of from 0.2 to 4,000 g, based on 1 g of said solid titanium catalyst component (A), the prepolymer being composed of 70 to 98 mol % of propylene units and 30 to 2 mol % of units of said α-olefin having 2 to 6 carbon atoms other than propylene, and having an intrinsic viscosity (η), as measured in decalin at 135° C., of from 0.2 to 20 dl/g, and (II) an organometallic compound catalyst component of a metal belonging to Groups I and III in the periodic table, and (III) an electron donor selected from the group consisting of diethers having 3 to 20 carbon atoms and organosilicon compounds represented by the formula

$$R_n Si(OR')_{4-n} \qquad (1)$$

wherein R and R' represent each a hydrocarbon group and n is a number satisfying $0 \leq n < 4$.

7. An olefin polymerization catalyst comprising
(Ib) a solid catalyst component for olefin polymerization formed by prepolymerization of olefin on an olefin polymerization catalyst comprising
a solid titanium catalyst component (A) comprising magnesium, titanium and halogen as its essential ignredients, an organometallic compound catalyst component (B) of a metal belonging to Groups I and III in the periodic table, and an electron donor (C) selected from the group consisting of diethers having 3 to 20 carbon atoms and organosilicon compounds represented by the formula

$$R_n Si(OR')_{4-n} \qquad (1)$$

wherein R and R' represent each a hydrocarbon group and n is a number satisfying $0 \leq n < 4$, and being in suspension in a liquid hydrocarbon solvent (D), wherein propylene and at least one α-olefin having 2 to 6 carbon atoms other than propylene are prepolymerized on said olefin polymerization catalyst, in an amount of from 0.2 to 4,000 g, based on 1 g of said solid titanium catalyst component (A), the prepolymer being composed of 70 to 98 mol % of propylene units and 30 mol to 2 mol % of units of said α-olefin having 2 to 6 carbon atoms other than propylene, and having an intrinsic viscosity (η), as measured in decalin at 135° C., of from 0.2 to 20 dl/g, (II) an organometallic compound catalyst component of a metal belonging to Groups I to III in the periodic table, and (III) an electron donor selected from the group consisting of diethers having 3 to 20 carbon atoms and organosilicon compounds represented by the formula

$$R_n Si(OR')_{4-n} \qquad (1)$$

wherein R and R' have the same meanings as defined above.

8. An olefin polymerization catalyst as claimed in claim 5, 6 or 7, wherein said solid titanium catalyst component (A) further comprises an electron donor.

* * * * *